(12) United States Patent
Tanabe et al.

(10) Patent No.: US 9,671,033 B2
(45) Date of Patent: Jun. 6, 2017

(54) METHOD AND APPARATUS FOR CONTROLLING A SOLENOID ACTUATED INLET VALVE

(71) Applicant: Hitachi, Ltd., Tokyo (JP)

(72) Inventors: Yosuke Tanabe, West Bloomfield, MI (US); Donald J. McCune, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 870 days.

(21) Appl. No.: 13/710,827

(22) Filed: Dec. 11, 2012

(65) Prior Publication Data

US 2014/0158205 A1 Jun. 12, 2014

(51) Int. Cl.
| | |
|---|---|
| F16K 31/06 | (2006.01) |
| F04B 7/00 | (2006.01) |
| F02D 41/38 | (2006.01) |
| F02M 59/36 | (2006.01) |
| F02D 41/20 | (2006.01) |

(52) U.S. Cl.
CPC ...... *F16K 31/0655* (2013.01); *F02D 41/3845* (2013.01); *F04B 7/0076* (2013.01); *F02D 2041/2055* (2013.01); *F02D 2041/2068* (2013.01); *F02D 2200/025* (2013.01); *F02D 2200/0602* (2013.01); *F02M 59/367* (2013.01); *Y10T 137/0318* (2015.04)

(58) Field of Classification Search
CPC ...... F04B 49/03; F04B 49/225; F04B 7/0076; F04B 13/00; F04B 39/08; F04B 39/1013; F04B 49/02; F04B 49/06; F04B 49/22; F04B 53/001; F04B 53/10; F04B 2201/0601; F04B 2201/0602; F16K 31/0655; F02D 41/3845; F02D 2041/2068; F02D 2041/2055; F02D 2200/0602; F02D 2200/025
USPC ........................................................ 417/298
See application file for complete search history.

(56) References Cited

U.S. PATENT DOCUMENTS

| | | | | |
|---|---|---|---|---|
| 3,756,204 | A * | 9/1973 | Suda .............................. | 123/485 |
| 5,959,825 | A * | 9/1999 | Harcombe ..................... | 361/154 |
| 6,017,017 | A * | 1/2000 | Lutz ........................ | B60T 8/36 |
| | | | | 123/90.11 |
| 6,128,175 | A * | 10/2000 | Wright .................... | F02D 41/20 |
| | | | | 361/154 |
| 6,446,610 | B1 * | 9/2002 | Mazet .......................... | 123/497 |
| 7,013,876 | B1 * | 3/2006 | Puckett et al. ................ | 123/490 |
| 7,293,548 | B2 * | 11/2007 | Oono ........................... | 123/446 |
| 7,552,720 | B2 | 6/2009 | Borg et al. | |
| 7,757,663 | B2 | 7/2010 | Usui et al. | |
| 2008/0053405 | A1 * | 3/2008 | Vigild et al. ............. | 123/406.26 |
| 2010/0237266 | A1 * | 9/2010 | Haaf et al. ................ | 251/129.15 |

* cited by examiner

Primary Examiner — William H Rodriguez
Assistant Examiner — Charles Nichols
(74) Attorney, Agent, or Firm — Mattingly & Malur, PC

(57) ABSTRACT

A method and apparatus for controlling a solenoid actuated inlet valve to a pump chamber of a piston pump. A control circuit energizes the solenoid to open the inlet valve in synchronism with the reciprocation of the piston and thereafter de-energize the solenoid to initiate closure of the inlet valve. The inlet valve is decelerated following de-energization of the solenoid thus effectively reducing engine noise attributable to the inlet valve.

2 Claims, 6 Drawing Sheets

METHOD AND APPARATUS FOR CONTROLLING A SOLENOID ACTUATED INLET VALVE

BACKGROUND OF THE INVENTION

I. Field of the Invention

The present invention relates generally to fuel pumps and, more particularly, to a method and apparatus for controlling a solenoid actuated inlet valve of a fuel pump to thereby reduce engine noise.

II. Description of Relevant Art

Direct fuel injection internal combustion engines have enjoyed increasing popularity in the automotive industry. Such direct injection internal combustion engines enjoy improved fuel economy and engine performance as contrasted with other types of automotive internal combustion engines.

In a direct fuel injection internal combustion engine, the fuel injector is open directly to the internal combustion chamber of the engine rather than upstream from the air intake valves. As such, the direct fuel injection internal combustion engine must generate relatively high fuel injection pressures in order to overcome the high pressures present in the internal combustion chamber during the fuel injection into the combustion chamber.

With reference to FIG. 1, a conventional prior art fuel delivery system for an automotive engine, such as a direct injection engine, is illustrated diagrammatically. The fuel delivery system 20 includes a fuel pump 22 having a fuel pressurization chamber 24. A piston 26 is reciprocally mounted within the chamber 24 and is reciprocally driven by a cam 28 which is rotatably driven in synchronism with the engine output shaft (not shown).

A fuel tank 30 provides fuel to the pressurization chamber 24 through an inlet valve 32. A solenoid 34 is mechanically coupled with the inlet valve 32 and, when energized, moves the valve to an open position and, conversely, moves the valve 32 to a closed position when de-energized. A valve control circuit 33, which preferably includes a programmed processor, controls the energization of the solenoid 34 through a solenoid connector 35.

During the downward stroke of the piston 26 and with the inlet valve 32 in an open position, the piston 26 inducts fuel through the valve 32 and into the chamber 24. Conversely, during the upward travel of the piston 26 and with the valve 32 in a closed position, the piston 26 pumps fuel from the pump chamber 24, through a one way outlet valve 36, and into a fuel rail 38.

FIG. 2 is a timing diagram of these previously described fuel pumps. As shown in FIG. 2, graph 40 represents the position of the piston 28 between its top dead center (TDC) and bottom dead center (BDC) positions. The actual shape of the graph 40 will vary depending upon the shape of the cam 28 (FIG. 1), but generally the graph 40 of the piston position is sinusoidal in shape.

Graph 42 represents the voltage output from the control circuit 36 to actuate the solenoid 34. As can be seen in FIG. 2, the solenoid 34 is energized in between TDC and BDC and de-energized in between BDC and TDC to maintain the rail pressure.

Graph 44 represents the position of the pump inlet valve 32 between a closed position 46 and an open position 48. Graph 44 representing the position of the inlet valve 32 does not precisely follow the actuation graph 42 for the solenoid 34 because inertia of the inlet valve 32 and a finite amount of time required to energize or de-energize the solenoid 34 retard the motion of the inlet valve 32. Consequently, the opening of the valve as illustrated at 50 is much more gradual than the step shown for graph 42. Likewise, the closing of the valve as indicated at 52 tapers gradually over a finite time period following de-energization of the solenoid 34.

Still referring to FIG. 2, graph 54 represents the pressure within the pump chamber 24. While the inlet valve 32 is open, the pressure within the pump chamber 24 remains a relatively steady and at same as feed pressure. However, during closure of the valve 32, the pressure within the fuel chamber 24 rapidly drops to a low value as shown at 56 because the closure of the valve 32 accelerate returning fuel from the pump chamber 24 into the fuel tank 30. Then after the inlet valve 32 is close, the upward stroke of the piston 26 rapidly increases the pressure within the pump chamber 24 to a high value indicated at 58.

Thereafter, the opening of the one way outlet valve 36 immediately causes a slight reduction in the pressure in the pump chamber 24 as shown in 60. However, the continued upward stroke of the piston 26 continues to increase the fuel chamber 24 pressure to a maximum value as shown at 62. The opening of one or more fuel injectors coupled with the downward stroke of the piston 26 then rapidly decreases the pump chamber 24 pressure to a low point as shown at 64 whereupon the above process is repeated.

Graph 66 represents the pressure within the fuel rail 38 as a function of time.

One disadvantage of direct injection engines is that the fuel pumps are relatively noisy, especially at low engine speeds. A significant part of this noise is attributable to the opening and closing of the inlet valve 32 and the resulting pressure swings indicated at 56 and 58. These sharp pressure variations result in pressure shock and engine noise.

SUMMARY OF THE PRESENT INVENTION

The present invention provides both a method and apparatus for controlling the actuator for a solenoid actuated inlet valve to a fuel pump chamber which reduces engine noise attributable to the fuel inlet valve motion.

The fuel pump utilizes a fuel pump like that shown in FIG. 1 in which a piston is reciprocally mounted within a fuel pump chamber and is reciprocally driven by a camshaft. A fuel inlet valve is fluidly positioned between a fuel tank and the fuel pump chamber. This valve is controlled by a solenoid which moves the valve to an open position, when energized, and to a closed position when de-energized.

In a first embodiment, following the de-energization of the solenoid and while the valve is moving from its open towards its closed position, the control circuit for the solenoid generates a short voltage pulse. This short voltage pulse effectively decelerates the closure of the valve thereby reducing the mechanical noise of the valve as it closes. Since the valve decelerates while closing, the noise attributable to the pressure shock of a rapidly closing valve and its attendant noise is also reduced.

In a further modification, a pressure shock sensor is attached to the pump. This pressure shock sensor generates an output signal to the control circuit for the solenoid representative of the magnitude of the pressure shock caused by the valve closure. The control circuit for the solenoid then utilizes the output from the pressure shock sensor to calculate not only the initiation but also the termination of the voltage pulse to the solenoid following the de-energization of the solenoid and during the period of valve closing.

In yet another embodiment, a resistor-capacitor (RC) circuit is electrically connected across the input terminals for the solenoid. The resistor-capacitor circuit thus dampens the voltage applied to or removed from the solenoid coil. This, in turn, results in a deceleration both of the valve opening time and valve closing time as a function of the RC constant. This deceleration in turn reduces the overall pressure shock from the valve during both valve closure as well as valve opening.

As a further modification, a variable resistor replaces the resistor in the resistor-capacitor network. The magnitude of the resistor, and thus of the RC constant, varies as a function of engine speed and fuel pressure and is controlled by the control circuit.

BRIEF DESCRIPTION OF THE DRAWING

A better understanding will be had upon reference to the following detailed description when read in conjunction with the accompanying drawing, wherein like reference characters refer to like parts throughout the several views, and in which.

DETAILED DESCRIPTION OF PREFERRED

Embodiments of the Present Invention

Figure 3:
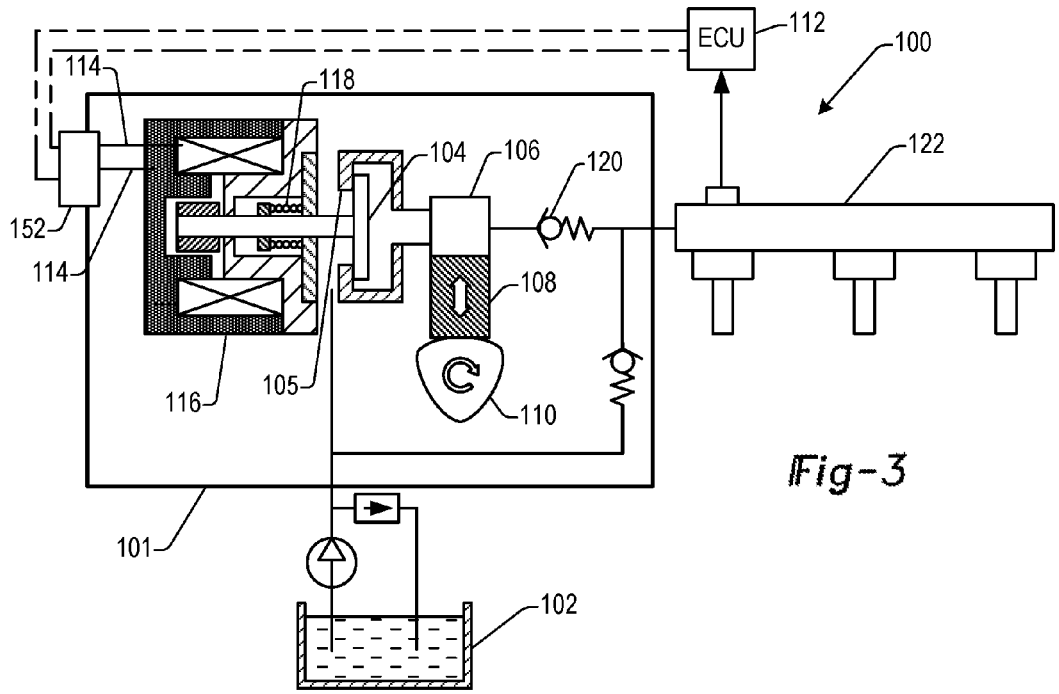
FIG. 3 is a view illustrating a first embodiment of a fuel system for an automotive internal combustion engine.

With reference first to FIG. 3, an exemplary fuel pumping system 100 is illustrated. Like the previously described systems, the fuel system 100 includes a fuel pump 101, a fuel tank 102 which is fluidly connected through a port 105 and a fuel inlet valve 104 to a pump chamber 106. A piston 108 is reciprocally driven in the pump chamber by a rotating cam 110 which rotates in synchronism with the engine crankshaft or output shaft (not shown).

An electronic control circuit 112, which preferably includes a programmed processor, is electrically connected via a solenoid connector 152 to the input terminals 114 of a solenoid 116 that is mechanically connected to the inlet valve 104. Upon energization of the solenoid 116, the solenoid moves the valve to its open position. Conversely, upon de-energization of the solenoid 116, a spring 118 returns the valve 104 to its closed position. In addition, a one way outlet valve 120 fluidly connects the pump chamber 106 to a fuel rail 122 of an automotive internal combustion engine.

During the operation of the fuel system 100, the cam 110 is rotatably driven by the engine which, in turn, reciprocally drives the piston 108 in the pump chamber 106. During the downstroke of the piston 108 and with the valve 104 in an open position, the piston 108 inducts fuel through the valve port 105 and into the pump chamber 106. Conversely, upon closure of the valve 104 and during the upstroke of the piston 108, the piston 108 pumps fuel through the outlet valve 120 and to the fuel rail 122.

Figure 4:
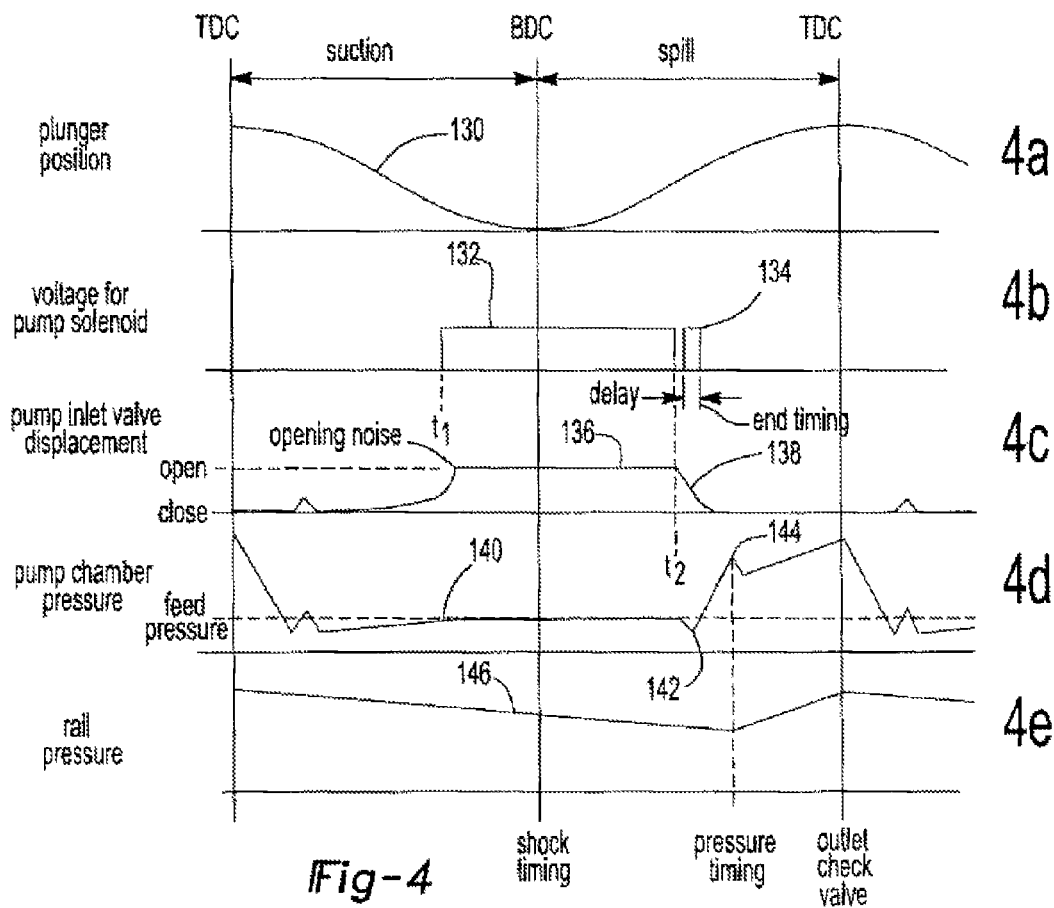
FIG. 4 is a timing chart illustrating the fuel system timing for the fuel system of FIG. 3.

With reference now to FIGS. 4a-4e, timing graphs are illustrated of the fuel pumping system. Specifically, graph 130 in FIG. 4a represents the movement of the piston 108 between top dead center position and bottom dead center position of the plunger. The position of the plunger as represented by graph 4a is substantially identical to that shown in graph 40 in FIG. 2.

In FIG. 4b, graph 132 represents the voltage applied by the control circuit 112 to the solenoid 116. The energization of the valve occurs at time $t_1$ at which time voltage is applied to the solenoid 116 and the initiation of the valve opening begins. At time $t_2$, the solenoid 116 is de-energized by removing the voltage from the solenoid 116. However, unlike the previously described fuel systems, following the de-energization of the solenoid 116 at time $t_2$ and during the closure of the valve 104, the electronic control circuit 112 generates a back pulse 134. This back pulse 134 effectively decelerates the closure of the valve 104. Consequently, as shown by graph 136 in FIG. 4c, the deceleration of the valve closure caused by the back pulse 134 causes the pump inlet valve displacement to taper more slowly to a closed position as shown by portion 138 in FIG. 4c. This deceleration not only reduces the shock imparted by the valve 142 as it contacts its housing, but also reduces the mechanical noise caused by the impact of the valve 104 against its housing.

Figure 1:
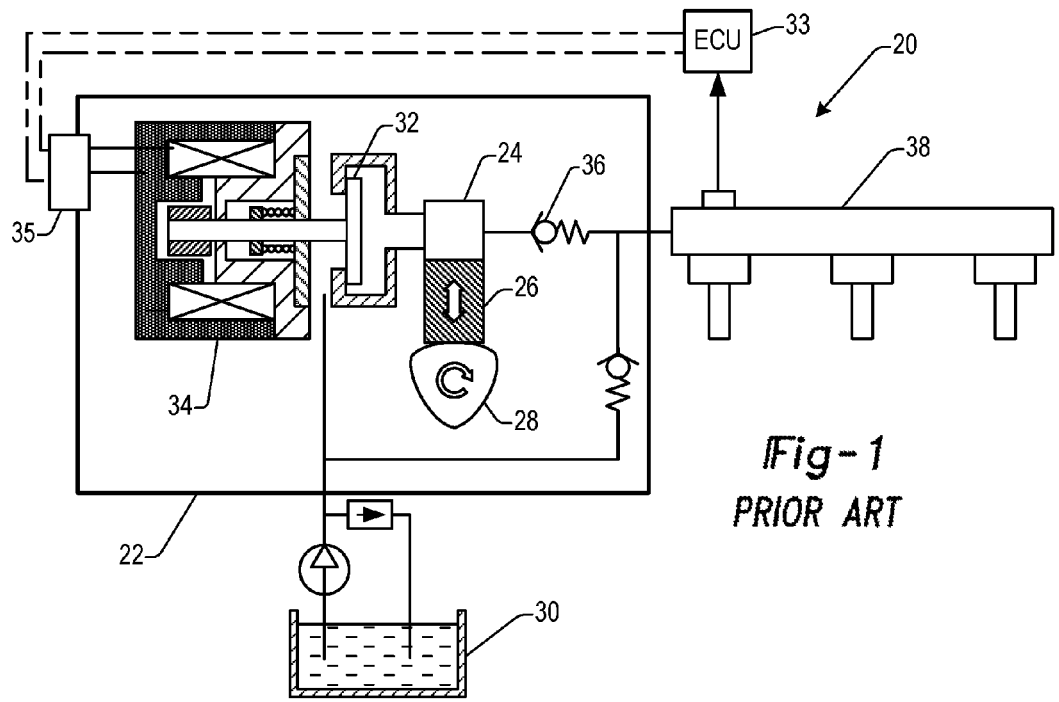
FIG. 1 is a diagrammatic view illustrating a prior art fuel pump system for an automotive internal combustion engine.
Figure 2:
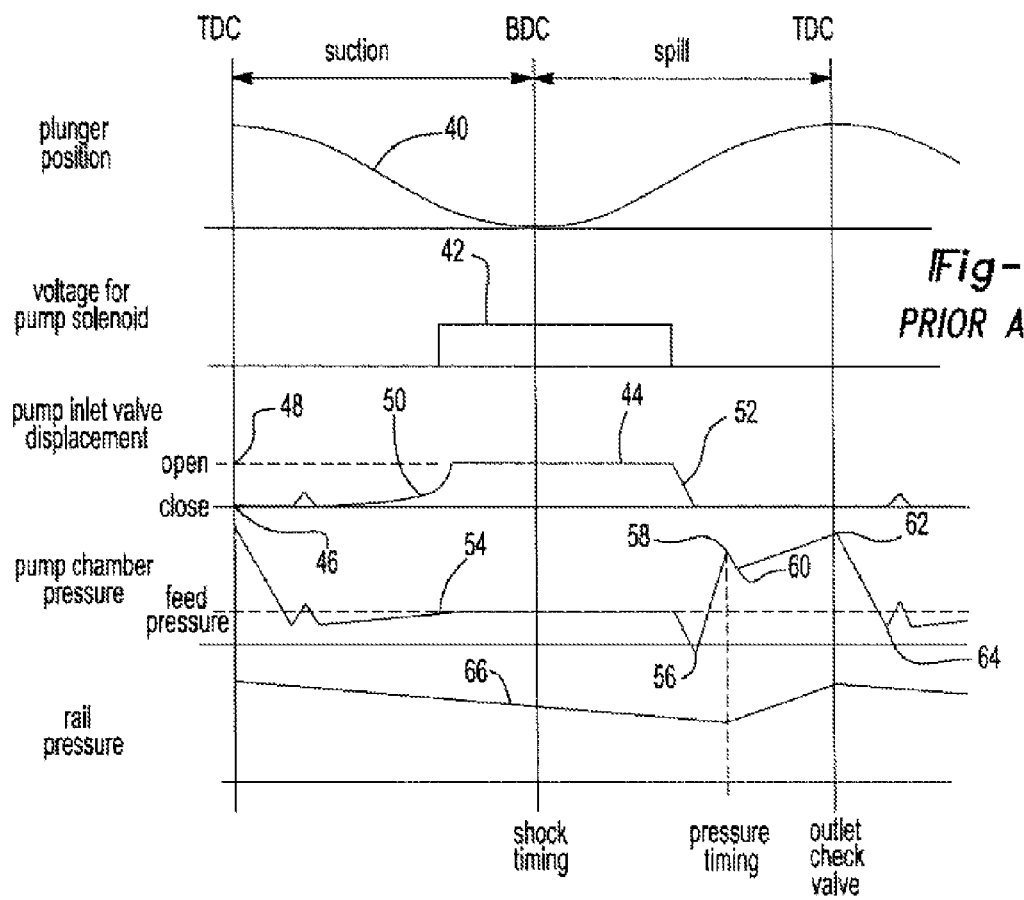
FIG. 2 is a timing chart illustrating the operation of the fuel delivery system.

The pump chamber pressure graph 140 shown in FIG. 4d demonstrates the net effect of the deceleration of the inlet valve closure immediately following time $t_2$. More specifically, although the pump chamber pressure does incur a pressure shock at time 142 followed by a pressure peak at time 144, the magnitude between the low pump pressure at time 142 and the pump pressure at time 144 is much less than the pressure swing between times 56 and 58 as shown in FIG. 2 without the back pulse 134. Furthermore, the overall effect on the graph 146 of the rail pressure in FIG. 4E is negligible, if any, as compared to graph 66 in FIG. 2. This demonstrates that there is no degradation in the overall performance of the pump.

Consequently, it can be seen that, by providing the back pulse 134 to decelerate the valve during closure, a substantial reduction in engine noise is achieved without any degradation of fuel pump performance.

Figure 5:
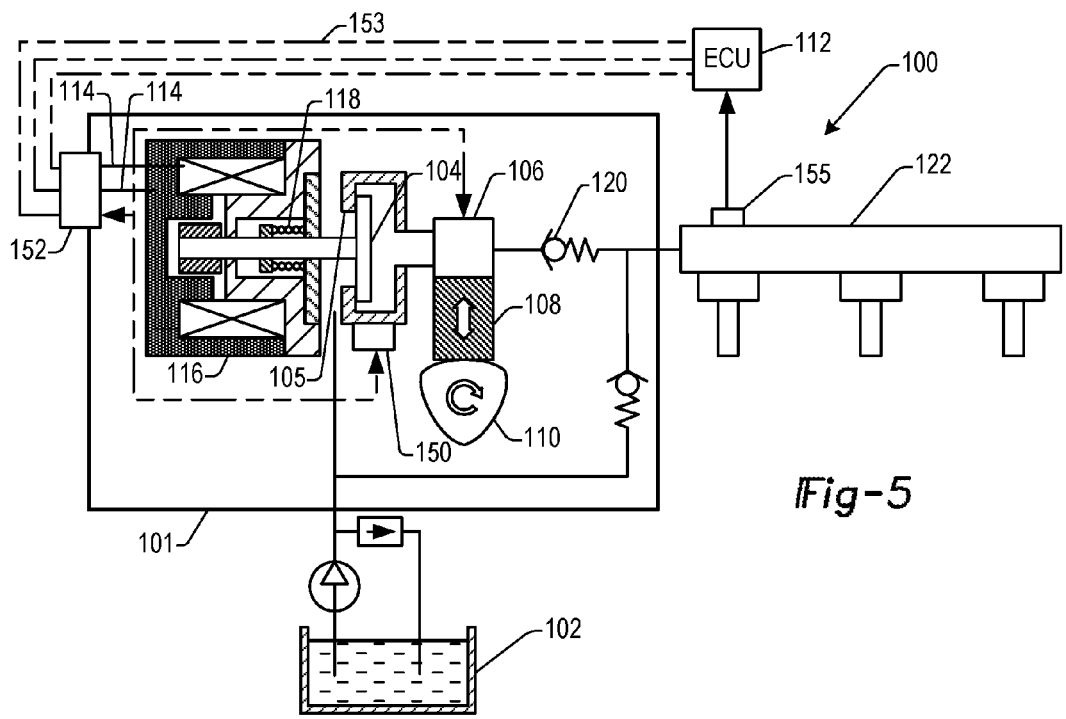
FIG. 5 is a view similar to FIG. 3, but illustrating a modification thereof.

With reference now to FIG. 5, a modification is shown for a fuel system 100'. The fuel system 100' illustrated in FIG. 5 is similar to the fuel system illustrated in FIG. 3 and like reference numerals will refer to like parts in both FIG. 3 and FIG. 5. Therefore, the overall description of the fuel system 100 in FIG. 3 shall apply equally to FIG. 5 and will not be repeated.

FIG. 5 differs, however, from FIG. 3 in that a pressure shock sensor 150 is mechanically attached to the pump system in any conventional fashion. For example, the pressure shock sensor may be mounted to the solenoid 116, valve housing 105, or even the pump chamber 106 to detect the pressure shock caused by the fuel system. The pressure shock sensor 150 generates an output signal representative of the pressure shock and this signal is electrically connected through a solenoid connector 152 back to the control circuit 112. In FIG. 5, the output signal of the pressure shock is transferred from the shock sensor 150 to the ECU 112 via independent signal line 153. For this purpose, the connector 152 may have 3 leads, 2 for solenoids 116 and one for shock signal from the shock sensor 150. But these 3 lines may be aggregated to 1 or 2 lines.

The use of the pressure shock sensor 150 enables the control circuit 112 for the solenoid 116 to more accurately calculate not only the time of initiation of the back pulse 134, i.e. the delay of the initiation of the back pulse 134 following the de-energization of the solenoid at time $t_2$ (FIG. 4) but also the duration of the back pulse for maximum engine efficiency and greatest noise reduction. The calculation of the initiation and width of the back pulse 134 will vary as a function of the magnitude of the shock signal from the shock sensor 150 and also the fuel pressure at the outlet for the fuel pump system 100'.

Figure 6:
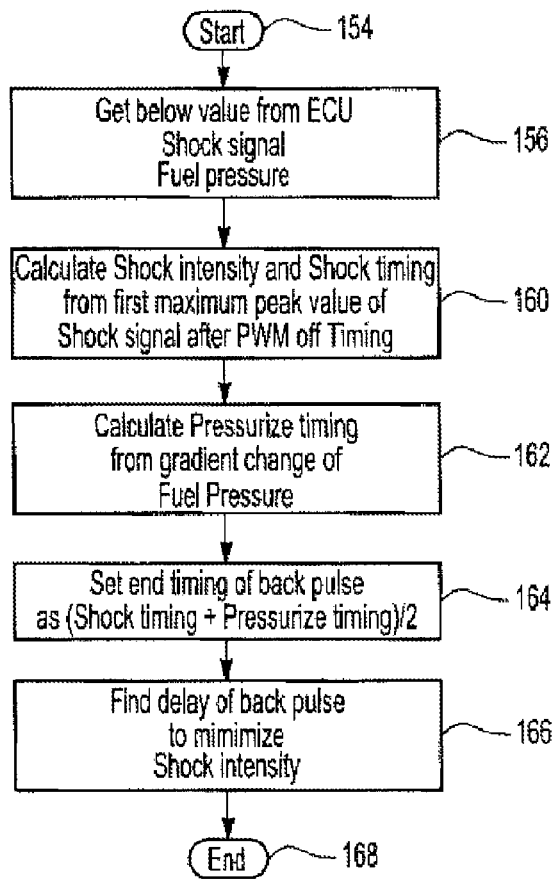
FIG. 6 is a flowchart illustrating the operation of the fuel system of FIG. 5.

With reference now to FIG. 6, a flowchart is shown which illustrates the operation of the pressure shock sensor. This flowchart will be executed typically by a microprocessor contained in the control circuit 112. The program first starts at step 154 which then proceeds to step 156.

At step 156, the control circuit 112, typically the Engine Control Unit (ECU) for the engine, reads not only the signal from the shock sensor 150 but also from a separate fuel pressure sensor 158 (FIG. 5). Once these values are obtained, the program proceeds to step 160.

At step 160, the program calculates the shock intensity and shock timing from the first maximum peak value of the shock signal after the pulse width modulation used to energize the solenoid 116 is turned off. Typically, a lookup table is used at step 160 to simplify the necessary calculations. Step 160 then proceeds to step 162.

At step 162, the pulse width of the back pulse 134 is determined from the gradient change of the fuel pressure as determined from the fuel pressure sensor 155. Step 162 then proceeds to step 164 where the end timing of the back pulse is determined in accordance with the following formula:

$$\text{end timing} = \frac{\text{shock timing} + \text{pressure timing}}{2}$$

Step 164 then proceeds to step 166. At step 166, the program determines the delay of the back pulse, i.e. the delay following the de-energization of the solenoid coil, in order to minimize shock intensity. Again, a lookup table may be used to simplify any desired calculations. Step 166 then proceeds to step 168 where the program is terminated.

Figure 7:
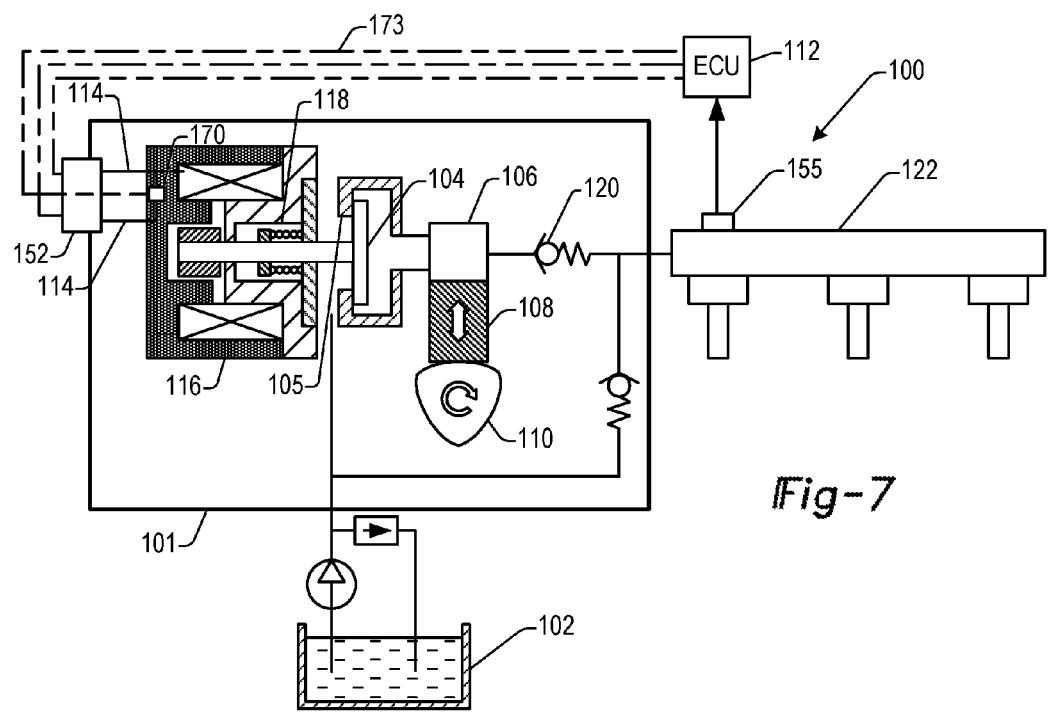
FIG. 7 is a diagrammatic view of a fuel system illustrating yet a further embodiment.

With reference now to FIG. 7, a still further embodiment is shown. FIG. 7 is similar to previously described FIG. 3 and like reference characters in FIG. 7 refer to like parts in FIG. 3. Therefore, the description of FIG. 3 is incorporated by reference and will not be repeated.

Unlike the previously described embodiments, the embodiment shown in FIG. 7 does not utilize a back pulse to decelerate the closure of the valve 104. Instead, a passive rise time controller 170 is connected across the solenoid terminals 114 to decelerate the closure of the valve 104 and thus diminish the valve noise caused by the fuel pump. In FIG. 7, rise time control signal is transferred from the ECU 112 to the passive rise time controller 170 via independent signal line 173. For this purpose, the connector 152 may have 3 leads, 2 for the solenoid 116 and one for rise time control signal from the ECU 112. But these 3 lines may be aggregated to 1 or 2 lines.

Figure 8:
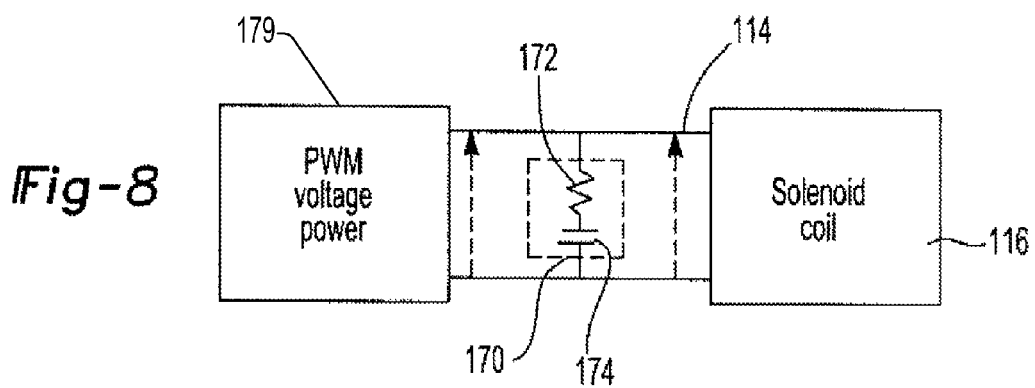
FIG. 8 is a diagrammatic schematic view of a portion of the fuel system of FIG. 7.

One exemplary raise time controller is illustrated in FIG. 8 as including a resistor 172 and capacitor 174 which are connected in series with each other across the solenoid terminals 114. With the RC series components connected across the solenoid terminals 114, upon energization of the solenoid, the voltage increases exponentially up to the voltage of the power source, PWM voltage power 179, at a rate dependent upon the values of both the capacitor 174 and the resistor 172.

Figure 9:
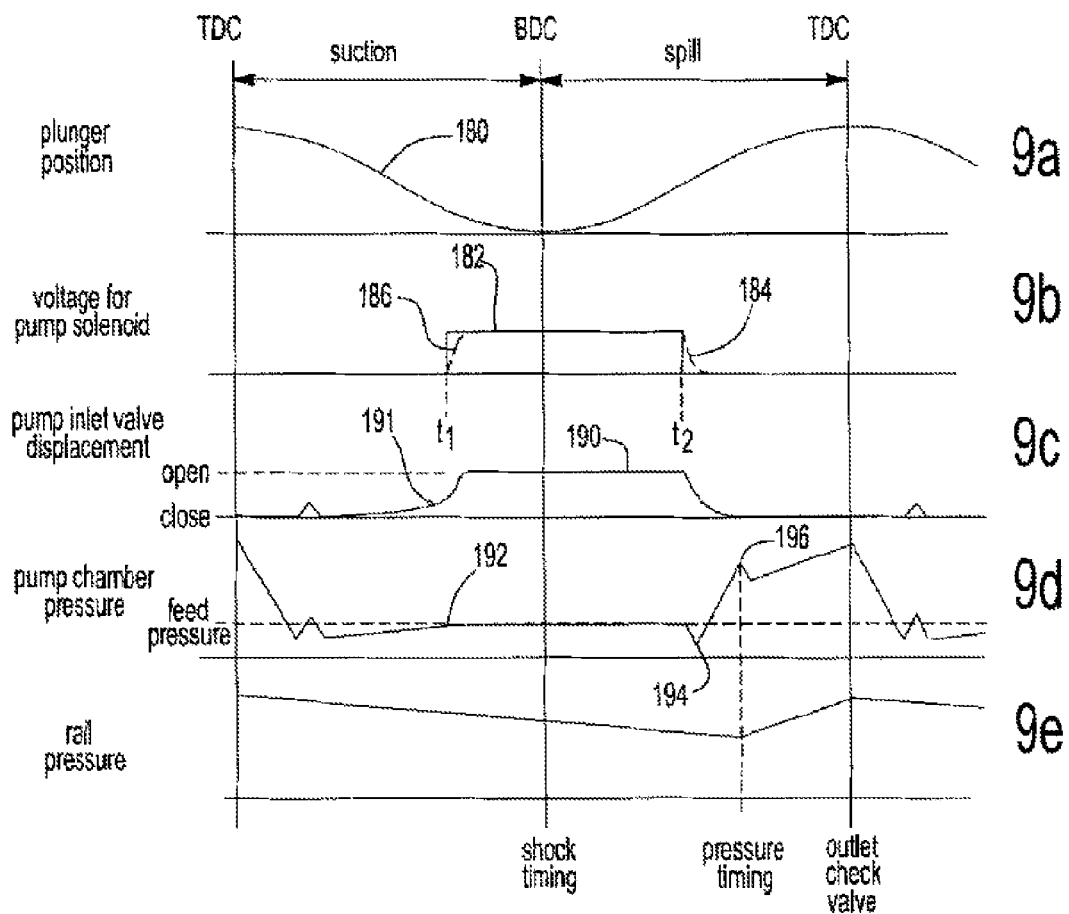
FIG. 9 is a timing diagram of the fuel system of FIG. 7.

With reference now to FIGS. 9A-9E, a timing chart for the overall fuel system of FIG. 7 is shown. Specifically, graph 180 in FIG. 9A represents the position of the plunger position which corresponds identically to the plunger position graph 4 in FIG. E and 40 in FIG. 2.

Graph 182 in FIG. 9B represents the voltage across the voltage terminals and in which, as before, the solenoid coil is de-energized at time T1. However, as shown at portion 184 of graph 182, upon de-energization of the solenoid coil, the voltage across the solenoid coil terminals 114 will decrease slowly or exponentially as shown at 184. This exponential decrease of the solenoid voltage is caused by the discharge of the capacitor 174 and serves to effectively decelerate the closure of the valve 104 in the desired fashion.

Additionally, because the capacitor 174 initially charges once the control circuit 114 energizes the solenoid coil, the rise time at $t_1$ following the energization of the solenoid occurs exponentially as shown at 186. The gradated increase of the voltage output to the solenoid following its energization at time $t_1$ also reduces the pump noise.

Graph 190 in FIG. 9C illustrates the position of the intake valve 104 with its more gradual rise and fall at times $t_1$ and $t_2$ respectively. This, in turn, provides for a pump pressure output graph 192 in FIG. 9D in which the magnitude between the pressure shocks at low pressure at time 194 and high pressure at time 196 is much less than without the RC network 170. The inlet valve displacement graph 190 at 50 exhibits a more gradual rise as shown at 191 in FIG. 9C.

Figure 10:
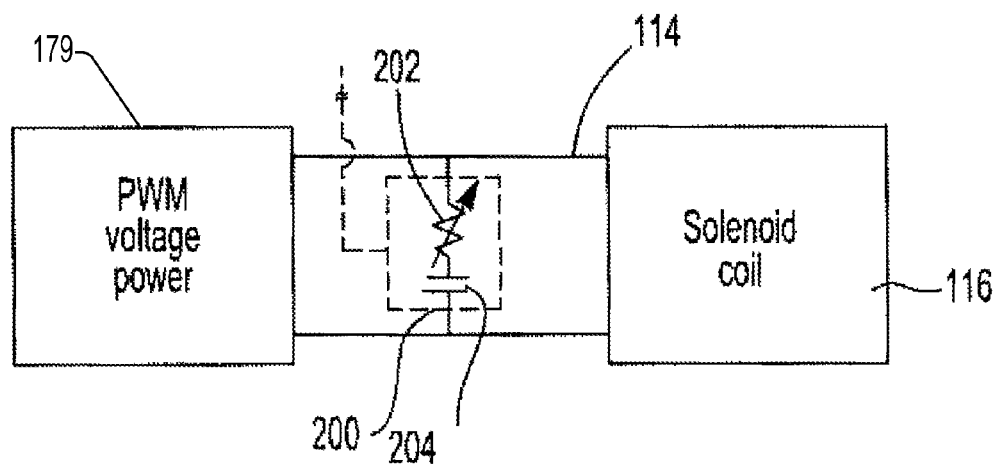
FIG. 10 is a diagrammatic schematic view illustrating a modification of FIG. 8.

With reference now to FIG. 10, a still further modification is shown which is essentially identical to the system shown in FIG. 7, except that the RC network 170 is replaced by an RC network 200 having a variable resistor 202 and a fixed capacitor 204. As before, the RC network 200 is electrically connected in between the terminals 114 for the solenoid coil 116.

Figure 11:
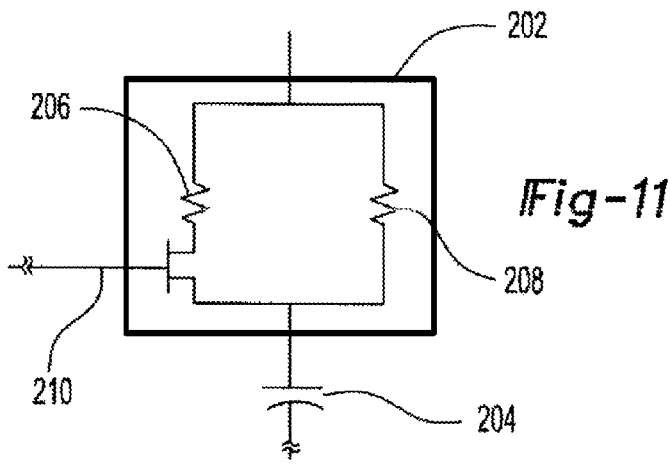
FIG. 11 is a schematic view illustrating the variable receiver.

With reference now to FIG. 11, one way of implementing the variable resistance 202 is illustrated in which two resistors 206 and 208 are connected in parallel in each other and in series with the capacitor 204. However, one resistor 206 is connected in series with a switch 210, such as a field effect transistor (FET). The input to the switch 210 may be controlled in any suitable fashion, such as by pulse width modulation (PWM), and effectively varies the resistance of the overall variable resistor 202 depending on the duty cycle.

Figure 12:
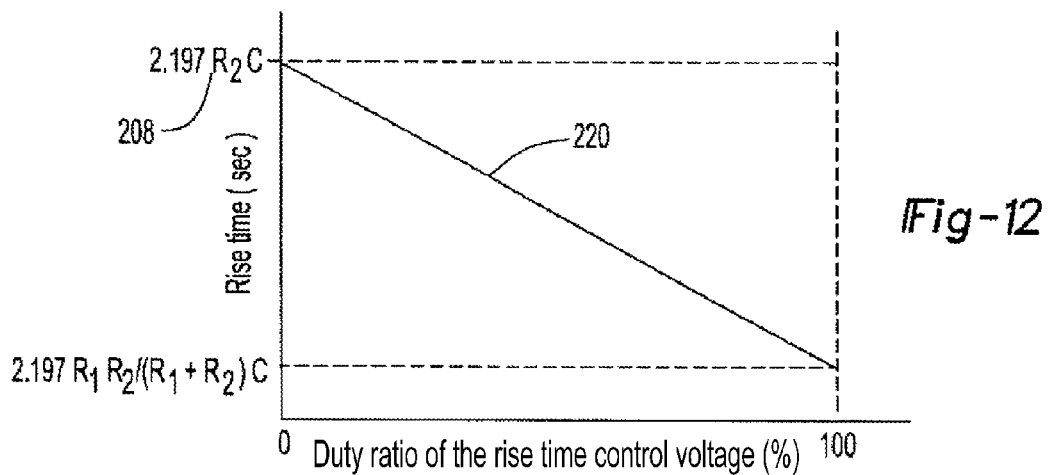
FIG. 12 is a graph illustrating the duty ratio versus rise time.

The effect of the pulse width modulation of the switch 210 is illustrated in FIG. 12. For example, assuming a pulse width modulation having a zero duty cycle, the resistor 206 is effectively removed from the variable resistor 202 so that the rise time in seconds is equal to $2.197 R_{208} C$. Conversely, as shown by graph 220 of the rise time as a function of duty cycle of the switch 210, at a 100% duty cycle, the resistor 206 is effectively connected in series with the resistor 208. As such, the overall resistance for the variable resistor 202 is equal to $2.197 R_{206} R_{208}/(R_{206}+R_{208}) C$. Consequently, since the rise time of the RC circuit 200 may be varied by varying the duty cycle or pulse width modulation of the switch 210, the rise time of the voltage applied to the solenoid as well as the decay time of the voltage present in the solenoid at de-energization can be controlled for minimum engine noise.

Figure 13:
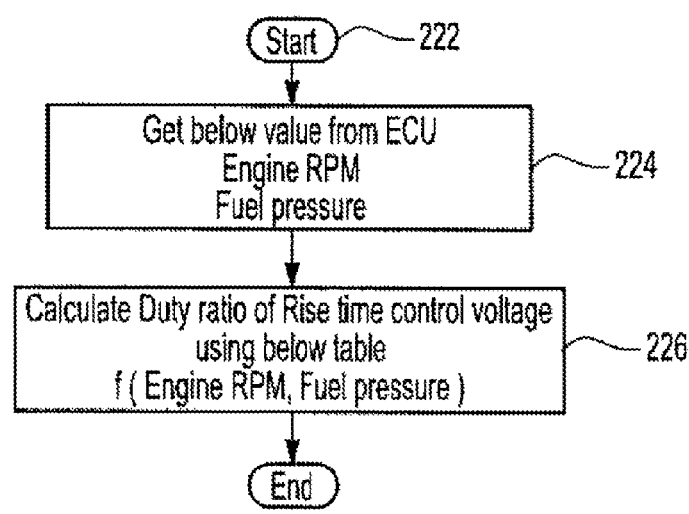
FIG. 13 is a flowchart illustrating the operation of the FIG. 10 embodiment.

With reference now to FIG. 13, a flowchart is there illustrated which is executed by the control circuit or ECU to determine the desired duty cycle for the switch 210. The routine starts at step 222 which then proceeds to step 224.

At step 224, the control circuit 112 obtains the value of both the engine RPM (rotation per minute) as well as the fuel pressure from the fuel pressure sensor 155. Step 224 then proceeds to step 226.

At step 226, the control circuit 112 calculates the duty cycle to minimize the engine noise as a function of both the engine RPM and the fuel pressure. Step 226, which may use a lookup table, is then used to control the pulse width modulation of the switch 210 to thus vary the rise time and decay time for the voltage on the solenoid terminals 114.

From the foregoing, it can be seen that the present invention provides a simple and yet effective mechanism to decelerate the closure of a fuel pump inlet valve in order to minimize fuel pump noise without degradation of fuel pump performance. Having described our invention, however, many modifications thereto will become apparent to those skilled in the art to which it pertains without deviation from the spirit of the invention as defined by the scope of the appended claims.

We claim:

1. A method for controlling an inlet valve actuated by a solenoid, the method comprising:
    providing a pump having a pump chamber, a piston reciprocally mounted in the pump chamber, the inlet valve fluidly connected to the pump chamber,
    energizing the solenoid to open the inlet valve in synchronism with reciprocation of the piston,
    thereafter de-energizing the solenoid to initiate closure of the inlet valve in synchronism with the reciprocation of the piston, and
    decelerating the closure of the inlet valve following de-energization of the solenoid by:
    connecting a resistor-capacitor network across energization terminals of the solenoid, wherein the resistor-capacitor network includes a variable resistor, and
    varying a value of the variable resistor as a function of a fuel pressure after an outlet of the pump and a speed of the piston of the pump.

2. An apparatus for controlling an inlet valve actuated by a solenoid, the apparatus comprising:
    a pump having a pump chamber having an inlet, said inlet valve being fluidly connected to said pump chamber,
    a piston reciprocally mounted in the pump chamber,
    a controller configured to:
    energize the solenoid to open the inlet valve in synchronism with the reciprocation of the piston,
    de-energize the solenoid to initiate closure of the inlet valve in synchronism with the reciprocation of the piston, and
    generate output signals which decelerate the closure of the valve following de-energization of the solenoid, wherein:
    the controller comprises a resistor-capacitor network electrically connected across energization terminals of the solenoid,
    the resistor-capacitor network includes a variable resistor, and
    the controller is configured to vary a value of the variable resistor as a function of a fuel pressure at an outlet of the pump and a speed of the piston of the pump.

* * * * *